United States Patent
Tardy-Tuch

(10) Patent No.: US 11,586,197 B2
(45) Date of Patent: Feb. 21, 2023

(54) DEVICE AND METHOD FOR INTERACTIVE AUTONOMOUS DRIVING

(71) Applicant: Dr. Ing. h.c. F. Porsche Aktiengesellschaft, Stuttgart (DE)

(72) Inventor: Georg Tardy-Tuch, Unterreichenbach-Kapfenhardt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 62 days.

(21) Appl. No.: 17/114,639

(22) Filed: Dec. 8, 2020

(65) Prior Publication Data

US 2021/0232135 A1    Jul. 29, 2021

(30) Foreign Application Priority Data

Jan. 23, 2020   (DE) ...................... 10 2020 101 519.4

(51) Int. Cl.
  *G05D 1/00*   (2006.01)
  *G05D 1/02*   (2020.01)

(52) U.S. Cl.
  CPC ......... *G05D 1/0016* (2013.01); *G05D 1/0061* (2013.01); *G05D 1/0223* (2013.01); *G05D 2201/0213* (2013.01)

(58) Field of Classification Search
  CPC .. G05D 1/0016; G05D 1/0061; G05D 1/0223; G05D 2201/0213
  See application file for complete search history.

(56) References Cited

U.S. PATENT DOCUMENTS

| 10,399,570 | B2 | 9/2019 | Braun |
| 10,773,751 | B2 | 9/2020 | Wanner et al. |
| 2009/0287367 | A1* | 11/2009 | Salinger ............... G05D 1/0246 701/23 |
| 2013/0002416 | A1 | 1/2013 | Gazit |
| 2015/0283998 | A1* | 10/2015 | Lind ..................... B60W 30/12 701/23 |
| 2016/0159350 | A1* | 6/2016 | Pilutti ................. B60W 30/143 701/23 |
| 2017/0297578 | A1* | 10/2017 | Braun ............ B60W 30/18163 |
| 2020/0164921 | A1 | 5/2020 | Augst |

FOREIGN PATENT DOCUMENTS

| DE | 102014107194 A1 | 11/2015 |
| DE | 102014220758 A1 | 4/2016 |
| DE | 102017213207 A1 | 2/2019 |
| WO | WO-2020260114 A1 * | 12/2020 .......... B60W 30/095 |

OTHER PUBLICATIONS

WO-2020260114-A1 english translation (Year: 2020).*

* cited by examiner

*Primary Examiner* — Anne Marie Antonucci
*Assistant Examiner* — Jingli Wang
(74) *Attorney, Agent, or Firm* — RatnerPrestia

(57) ABSTRACT

A method and device for interactive autonomous driving. A vehicle guidance controller is configured to detect, during operation of a vehicle in an autonomous operating mode, an order for intervention by a driver in a driving event on an input device, in particular a joystick. And, on denial of the order, the vehicle guidance controller is configured to determine at least one setpoint for the autonomous operating mode. The setpoint may influence a longitudinal guidance of the vehicle and/or a transverse guidance of the vehicle in the autonomous operating mode. The vehicle guidance controller is configured to control the vehicle autonomously in the autonomous operating mode depending on the setpoint.

15 Claims, 2 Drawing Sheets

DEVICE AND METHOD FOR INTERACTIVE AUTONOMOUS DRIVING

CROSS-REFERENCE TO RELATED APPLICATION

This application claims priority to German Patent Application No. 10 2020 101 519.4, filed Jan. 23, 2020, the content of such application being incorporated by reference herein in its entirety.

FIELD OF THE INVENTION

The invention concerns a device and a method for interactive autonomous driving.

BACKGROUND OF THE INVENTION

DE 10 2014 220 758 A1, which is incorporated herein by reference, discloses that a driver's request can be implemented by interaction by the driver during autonomous driving, wherein the autonomous driving system follows the driver's request as far as possible. The interaction by the driver takes place via the vehicle's steering wheel.

DE 10 2014 107 194 A1, which is incorporated herein by reference, describes a superposition steering system by means of which a driver's intervention, which is established during an autonomous operating mode of the motor vehicle, is performed. A driver can himself establish, merely by active control of the steering means, for example in the form of a steering wheel, how much control he would like over the steering system and hence over the motor vehicle. In an autonomous operating mode with active autonomous steering function, a harmonious transition between the driver and the steering function can thus be achieved.

DE102017213207A1, which is incorporated herein by reference, discloses a device for changing the transverse guidance of a vehicle configured for at least partially automated driving, wherein the device comprises a drive pedal and/or a brake pedal, and the device is configured, on actuation of the drive pedal and/or brake pedal during operation of the vehicle, to execute, suppress or influence an automated transverse guidance of the vehicle depending on a parameter of the vehicle's travel which represents the degree of automation.

US2013002416A1, which is incorporated herein by reference, discloses exemplary maneuvers, execution of which may be signaled to a vehicle when in autonomous mode.

SUMMARY OF THE INVENTION

These solutions either give the driver the feeling of complete control over the vehicle, or switch from autonomous operating mode into an operating mode which actually requires control by the driver.

In contrast, the method and device according to aspects of the invention offer a possibility for an improved interactive autonomous driving.

The device provides that a vehicle guidance controller is configured to detect, during operation of a vehicle in an autonomous operating mode, an order for intervention by a driver in a driving event at an input device, in particular a joystick, and on denial of the order, to determine at least one setpoint for the autonomous operating mode, wherein the setpoint may influence a longitudinal guidance of the vehicle and/or a transverse guidance of the vehicle in the autonomous operating mode, and to control the vehicle autonomously in the autonomous operating mode depending on the setpoint. In this way, an interactive autonomous driving is possible without leaving the autonomous operating mode.

Preferably, the vehicle guidance controller is configured to detect, at the input device, an order for a direction change, in particular a turn, an order for a speed change, in particular a faster or slower driving style, or an order for an overtaking process. These guidance instructions are particularly suitable for increasing the acceptance of autonomous driving.

Preferably, the vehicle guidance controller is configured either to detect the order for a direction change to the left with respect to a direction of travel from a movement of a handle of the input device to the left with respect to the direction of travel, and depending on the order for the direction change, to determine the setpoint for a steering movement of the autonomous vehicle to the left with respect to the direction of travel; or to detect the order for a direction change to the right with respect to a direction of travel from a movement of a handle of the input device to the right with respect to the direction of travel, and depending on the order for the direction change, to determine the setpoint for a steering movement of the autonomous vehicle to the right with respect to the direction of travel. This operating device is particularly ergonomic for a guidance instruction with regard to the direction change.

Preferably, the vehicle guidance controller is configured either to detect the order for a faster driving style from a movement of a handle of the input device to the front with respect to a direction of travel, and depending on the order for the faster driving style, to determine the setpoint for a faster driving style of the autonomous vehicle with respect to the direction of travel; or to detect the order for a slower driving style from a movement of a handle of the input device to the rear with respect to a direction of travel, and depending on the order for slower driving style, to determine the setpoint for a slower driving style of the autonomous vehicle with respect to the direction of travel. This operating device is particularly ergonomic for a guidance instruction with regard to the speed.

Preferably, the vehicle guidance controller is configured to detect the order for an overtaking process from a movement of a handle of the input device to the front left with respect to a direction of travel, and depending on the order for the overtaking process, to determine the setpoint for the overtaking process of the autonomous vehicle. This operating device is particularly ergonomic for a guidance instruction with regard to an overtaking process.

Preferably, the vehicle guidance controller is configured, on denial of the order, to execute the control of the vehicle autonomously depending on the setpoint and depending on an environment of the vehicle, and independently of a position of the handle in particular directly following the position of the handle when the order is detected. The fully autonomous operating mode is not abandoned. An unfavorable or erroneous guidance instruction may thereby be ignored.

The method provides that, during operation of a vehicle in an autonomous operating mode, an order is detected for intervention by a driver in a driving event at an input device, in particular a joystick, wherein on denial of the order, at least one setpoint for the autonomous operating mode is determined, wherein the setpoint influences a longitudinal guidance of the vehicle and/or a transverse guidance of the vehicle in the autonomous operating mode, and wherein the vehicle is controlled autonomously in the autonomous operating mode depending on the setpoint. This constitutes a particularly good autonomous vehicle guidance.

Preferably, it is provided that at the input device, an order is detected for a direction change, in particular a turn, an order for a speed change, in particular a faster or slower driving style, or an order for an overtaking process. Thus the vehicle is operated interactively.

Preferably, either the order for a direction change to the left with respect to a direction of travel is detected from a movement of a handle of the input device to the left with respect to the direction of travel, wherein depending on the order for the direction change, the setpoint is determined for a steering movement of the autonomous vehicle to the left with respect to the direction of travel; or the order for a direction change to the right with respect to a direction of travel is detected from a movement of a handle of the input device to the right with respect to the direction of travel, and depending on the order for the direction change, the setpoint is determined for a steering movement of the autonomous vehicle to the right with respect to the direction of travel. This reaction to a request for direction change is particularly intuitive for a driver.

Preferably, either the order for a faster driving style is detected from a movement of a handle of the input device to the front with respect to a direction of travel, wherein depending on the order for the faster driving style, the setpoint is determined for a faster driving style of the autonomous vehicle with respect to the direction of travel; or the order for a slower driving style is detected from a movement of a handle of the input device to the rear with respect to a direction of travel, wherein depending on the order for slower driving style, the setpoint is determined for a slower driving style of the autonomous vehicle with respect to the direction of travel. This reaction to a request for a speed change is particularly intuitive for a driver.

Preferably, the order for an overtaking process is detected from a movement of a handle of the input device to the front left with respect to a direction of travel, wherein depending on the order for the overtaking process, the setpoint is determined for the overtaking process of the autonomous vehicle. Thus an overtaking request is detected particularly intuitively and an overtaking process is then initiated autonomously.

Preferably, on denial of the order, the vehicle is controlled autonomously, depending on the setpoint and depending on an environment of the vehicle, and independently of a position of the handle directly following the position of the handle when the order is detected.

BRIEF DESCRIPTION OF THE DRAWING FIGURES

Further advantageous embodiments arise from the following description and the drawing. The drawing shows:

DETAILED DESCRIPTION OF THE INVENTION

In the description below, autonomous driving means automated transport from a starting point A to a destination B. Here the entire journey is fully automatic. The passengers thus interact with the vehicle in relation to navigation only with respect to a destination. With the device and method described below, despite the absence of a continuous vehicle guidance in the longitudinal and transverse direction, the driver is able to give interactive guidance instructions independently of the navigation.

Figure 1:
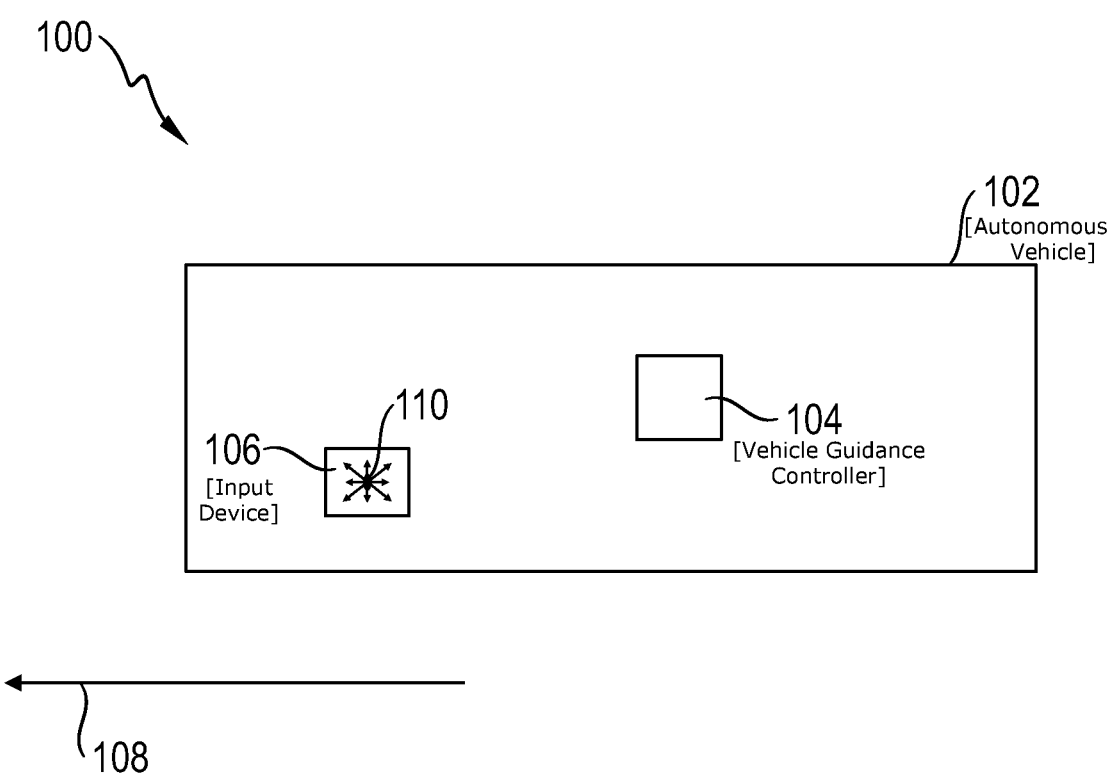
FIG. 1 is a diagrammatic depiction of a device for interactive autonomous driving.

FIG. 1 shows a diagrammatic depiction of a device 100 for interactive autonomous driving of a vehicle 102.

The device 100 comprises a vehicle guidance controller 104. The vehicle guidance controller 104 may be integrated in a control unit of the vehicle 102.

The vehicle guidance controller 104 is configured to detect an order for an intervention by a driver in a driving event at an input device 106 during operation of the vehicle 102 in an autonomous operating mode.

In the autonomous operating mode, the vehicle 102 moves autonomously in a direction of travel 108. The autonomous movement is controlled autonomously in the example by the vehicle guidance controller 104. The vehicle guidance controller 104 is configured to move the vehicle 102 in an environment, in particular on a road, independently of a driver input.

The input device 106 in the example is a joystick or a control element with equivalent functionality. The input device 106 in the example has a handle 110. The handle 110 can be moved in various directions with respect to the input device. A position and/or a movement of the handle 110 with respect to the input device 106 can be detected via an emitter which is integrated in the input device 106. A movement of the handle 110 with respect to the input device 106 corresponds to a movement of the handle 110 with respect to the direction of travel 108, in particular when the input device 106 is mounted in the vehicle 102.

The input device 106 is connected to the vehicle guidance controller 104 for the communication of orders. In the example, a connection is provided via a data line (not shown in FIG. 1), via which messages are exchanged which characterize a position of the handle and/or the orders described below.

The vehicle guidance controller 104 may be configured to detect, at the input device 106, an order for a direction change, in particular a turn, an order for a speed change, in particular a faster or slower driving style, or an order for an overtaking process.

The vehicle guidance controller 104 is configured, on denial of an order, to determine at least one setpoint for the autonomous operating mode. The setpoint may influence a longitudinal guidance of the vehicle 102 and/or a transverse guidance of the vehicle 102 in autonomous operating mode.

The vehicle guidance controller 104 is configured to control the vehicle 102 autonomously in the autonomous operating mode depending on the setpoint. This autonomous control includes, in one aspect, ignoring the order if this cannot be executed because of other parameters of the autonomous operating mode. For this, in this aspect, on denial of the order, the setpoint is determined independently of the order. This autonomous control includes, in one aspect, determining the setpoint at a later time than the time of detection of the order if this cannot be executed because of other parameters of the autonomous operating mode. For this, in one aspect, on denial of the order, the setpoint is determined, depending on the order, at a later time than the time of detection of the order.

The vehicle guidance controller 104 may be configured to detect the order for a direction change to the left with respect to a direction of travel 108 from a movement of a handle 110 of the input device 106 to the left with respect to the direction of travel 108, and depending on the order for the direction change, to determine the setpoint for a steering movement of the autonomous vehicle 102 to the left with respect to the direction of travel 108.

The vehicle guidance controller 104 may be configured to detect the order for a direction change to the right with respect to a direction of travel 108 from a movement of a handle 110 of the input device 106 to the right with respect to the direction of travel 108, and depending on the order for the direction change, to determine the setpoint for a steering movement of the autonomous vehicle 102 to the right with respect to the direction of travel 108.

The vehicle guidance controller 104 may be configured to detect the order for a faster driving style from a movement of a handle 110 of the input device 106 to the front with respect to a direction of travel 108, and depending on the order for the faster driving style, to determine the setpoint for a faster driving style of the autonomous vehicle 102 with respect to the direction of travel 108.

The vehicle guidance controller 104 may be configured to detect the order for a slower driving style from a movement of a handle 110 of the input device 106 to the rear with respect to a direction of travel 108, and depending on the order for the slower driving style, to determine the setpoint for a slower driving style of the autonomous vehicle 102 with respect to the direction of travel 108.

The vehicle guidance controller 104 may be configured to detect the order for an overtaking process from a movement of a handle 110 of the input device 106 to the front left with respect to a direction of travel 108, and depending on the order for the overtaking process, to determine the setpoint for the overtaking process of the autonomous vehicle 102.

The vehicle guidance controller 104 may be configured, on denial of the order, to execute the control of the vehicle 102 autonomously depending on the setpoint and depending on an environment of the vehicle 102, and independently of a position of the handle 110 in particular directly following the position of the handle 110 when the order was detected.

The vehicle guidance controller 104 may be configured to check whether or not the vehicle receives an order as a guidance instruction from the driver. If the vehicle 102 does not receive any guidance instructions, the vehicle guidance controller 104 may be configured to navigate the vehicle independently on the road travelled, i.e. a street. The vehicle guidance controller 104 may be configured, if necessary, to navigate in the direction of an entered destination or to request an instruction from the driver.

The input device 106 may also be used for maneuvering if autonomous driving is not possible. For this, the autonomous operating mode is abandoned.

Figure 2:
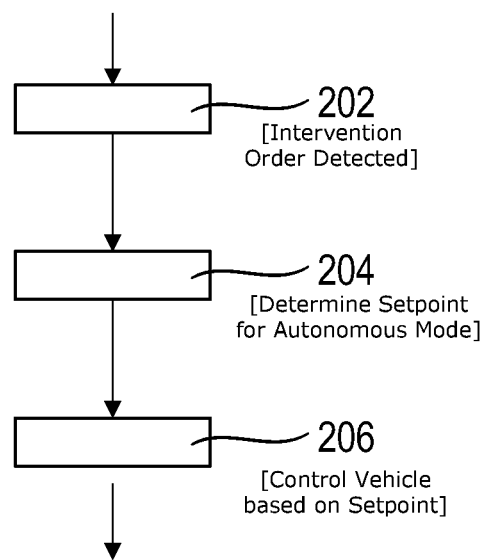
FIG. 2 shows steps in a method for interactive autonomous driving.

A method for interactive autonomous driving is described below with reference to FIG. 2. During the method, the vehicle is controlled autonomously, preferably uninterruptedly, in an autonomous operating mode. In said mode, an intervention by the driver does not act directly or immediately on the guidance of the vehicle.

During operation of the vehicle 102 in autonomous operating mode, in a step 202 an order is detected for an intervention by a driver in a driving event at an input device 106, in particular a joystick. At the input device 106, for example an order is detected for a direction change, in particular a turn, an order for a speed change, in particular a faster or slower driving style, or an order for an overtaking (i.e., passing) process.

On denial of the order, in a step 204, at least one setpoint for the autonomous operating mode is determined.

In the example, the setpoint influences a longitudinal guidance of the vehicle 102 and/or a transverse guidance of the vehicle 102 in autonomous operating mode. This autonomous control includes, in one aspect, ignoring the order if this cannot be executed because of other parameters of the autonomous operating mode. For this, in this aspect, on denial of the order, the setpoint is determined independently of the order. This autonomous control includes, in one aspect, determining the setpoint at a later time than the time of detection of the order if this cannot be executed because of other parameters of the autonomous operating mode. For this, in one aspect, on denial of the order, the setpoint is determined, depending on the order, at a later time than the time of detection of the order.

If for example, in step 202, the order for a direction change to the left with respect to a direction of travel 108 is detected from a movement of a handle 110 of the input device 106 to the left with respect to the direction of travel 108, then in step 204, depending on the order for the direction change, the setpoint is determined for a steering movement of the autonomous vehicle 102 to the left with respect to the direction of travel 108.

If for example, in step 202, the order for a direction change to the right with respect to a direction of travel 108 is detected from a movement of a handle 110 of the input device 106 to the right with respect to the direction of travel 108, then in step 204, depending on the order for the direction change, the setpoint is determined for a steering movement of the autonomous vehicle 102 to the right with respect to the direction of travel 108.

If for example, in step 202, the order for a faster driving style is detected from a movement of a handle 110 of the input device 106 to the front with respect to the direction of travel 108, then in step 204, depending on the order for the faster driving style, the setpoint is determined for a faster driving style of the autonomous vehicle 102 with respect to the direction of travel 108.

If for example, in step 202, the order for a slower driving style is detected from a movement of a handle 110 of the input device 106 to the rear with respect to the direction of travel 108, then in step 204, depending on the order for the slower driving style, the setpoint is determined for a slower driving style of the autonomous vehicle 102 with respect to the direction of travel 108.

If for example, in step 202, the order for an overtaking process is detected from a movement of a handle 110 of the input device 106 to the front left with respect to the direction of travel 108, then in step 204, depending on the order for the overtaking process, the setpoint is determined for the overtaking process of the autonomous vehicle 102.

In a step 206, the vehicle 102 is controlled autonomously in the autonomous operating mode depending on the setpoint. On denial of the order, the vehicle 102 is controlled autonomously depending on the setpoint and depending on the environment of the vehicle 102, and independently of a position of the handle 110 in particular directly following the position of the handle 110 on detection of the order. If, in step 204, it was established that the order cannot be executed, the setpoint is determined independently of the order. This means that the order is ignored. If, in step 204, it was found that the order can be executed at a later time than the time of detection of the order, the setpoint is only determined at this later time, depending on the order, and executed autonomously in step 206.

If the vehicle 102 receives no guidance instructions, it remains autonomously on the road travelled, and as far as necessary navigates in the direction of the entered destination or requests the driver to give an instruction.

The input device 106 may also be used for maneuvering if autonomous driving is not possible. For this, the autonomous operating mode is abandoned.

What is claimed:

1. A device for interactive autonomous driving, said device comprising:
    a vehicle guidance controller that is configured to detect, at an input device and during operation of a vehicle in an autonomous operating mode, an order for intervention by a driver for (i) a direction change, (ii) a turn, (iii) a speed change, or (iv) overtaking process,
    wherein the vehicle guidance controller is further configured to deny the order for intervention because the order does not meet parameters of the autonomous operating mode, and
    wherein, at a later time when the order for intervention does meet the parameters of the autonomous operating mode, the vehicle guidance controller is further configured to (i) determine at least one setpoint for the autonomous operating mode taking into account the order for intervention, wherein the setpoint influences a longitudinal guidance of the vehicle and/or a transverse guidance of the vehicle in the autonomous operating mode, and (ii) control the vehicle autonomously in the autonomous operating mode depending on the setpoint.

2. The device as claimed in claim 1, wherein the vehicle guidance controller is further configured either to detect the order for a direction change to the left with respect to a direction of travel from a movement of a handle of the input device to the left with respect to the direction of travel, and depending on the order for the direction change, to determine the setpoint for a steering movement of the autonomous vehicle to the left with respect to the direction of travel; or to detect the order for a direction change to the right with respect to a direction of travel from a movement of a handle of the input device to the right with respect to the direction of travel, and depending on the order for the direction change, to determine the setpoint for a steering movement of the autonomous vehicle to the right with respect to the direction of travel.

3. The device as claimed in claim 1, wherein the vehicle guidance controller is further configured either to detect the order for a faster vehicle speed from a movement of a handle of the input device to the front with respect to a direction of travel, and depending on the order for the faster vehicle speed, to determine the setpoint for the faster vehicle speed of the autonomous vehicle with respect to the direction of travel; or to detect the order for a slower vehicle speed from a movement of a handle of the input device to the rear with respect to a direction of travel, and depending on the order for the slower vehicle speed, to determine the setpoint for a slower vehicle speed of the autonomous vehicle with respect to the direction of travel.

4. The device as claimed in claim 1, wherein the vehicle guidance controller is further configured to detect the order for the overtaking process from a movement of a handle of the input device to the front left with respect to a direction of travel, and depending on the order for the overtaking process, to determine the setpoint for the overtaking process of the autonomous vehicle.

5. The device as claimed in claim 1, wherein, upon denial of the order for intervention because the order does not meet parameters of the autonomous operating mode, the vehicle guidance controller is further configured, on denial of the order, to execute the control of the vehicle autonomously depending on a setpoint that is calculated independently of the order for invention, and depending on an environment of the vehicle, and independently of a position of a handle of the input device directly following the position of the handle when the order is detected.

6. The device as claimed in claim 1, wherein the input device is a joystick.

7. The device as claimed in claim 1, wherein the setpoint is a longitudinal speed of the vehicle.

8. The device as claimed in claim 1, wherein, upon receiving the order for intervention, the vehicle guidance controller is further configured to continue operation of the vehicle in the autonomous operating mode, unless and until the order for intervention has been granted.

9. A method for interactive autonomous driving, said method comprising:
    (i) detecting, at an input device, an order for intervention by a driver in a driving event during operation of a vehicle in an autonomous operating mode, wherein the order is for (i) a direction change, (ii) a turn, (iii) a speed change, or (iv) an overtaking process,
    (ii) denying the order for intervention because the order does not meet parameters of the autonomous operating mode,
    (iii) at a later time when the order for intervention does meet the parameters of the autonomous operating mode, determining at least one setpoint for the autonomous operating mode taking into account the order for intervention, wherein the setpoint influences a longitudinal guidance of the vehicle and/or a transverse guidance of the vehicle in the autonomous operating mode, and
    (iv) autonomously controlling the vehicle in the autonomous operating mode depending on the setpoint.

10. The method as claimed in claim 9, further comprising detecting either (i) an order for a direction change to the left with respect to a direction of travel from a movement of a handle of the input device to the left with respect to the direction of travel, wherein depending on the order for the direction change, the setpoint is determined for a steering movement of the autonomous vehicle to the left with respect to the direction of travel; or (ii) an order for a direction change to the right with respect to a direction of travel is detected from a movement of a handle of the input device to the right with respect to the direction of travel, wherein depending on the order for the direction change, the setpoint is determined for a steering movement of the autonomous vehicle to the right with respect to the direction of travel.

11. The method as claimed in claim 9, further comprising detecting either (i) an order for a faster driving speed from a movement of a handle of the input device to the front with respect to a direction of travel, wherein depending on the order for the faster driving speed, the setpoint is determined for a faster driving speed of the autonomous vehicle with respect to the direction of travel; or (ii) an order for a slower driving speed is detected from a movement of a handle of the input device to the rear with respect to a direction of travel, wherein depending on the order for slower driving speed, the setpoint is determined for a slower driving speed of the autonomous vehicle with respect to the direction of travel.

12. The method as claimed in claim 9, further comprising detecting an order for an overtaking process from a movement of a handle of the input device to the front left with respect to a direction of travel, wherein depending on the order for the overtaking process, the setpoint is determined for the overtaking process of the autonomous vehicle.

13. The method as claimed in claim 9, wherein on denial of the order, the method comprises autonomously controlling the vehicle depending on a setpoint that is calculated independently of the order for invention and depending on an environment of the vehicle, and independently of a position of a handle of the input device directly following the position of the handle when the order is detected.

14. The method as claimed in claim 9, wherein the setpoint is a longitudinal speed of the vehicle.

15. The method as claimed in claim 9, wherein, between steps (ii) and (iii), the method further comprises operating the vehicle in the autonomous operating mode unless and until the order for intervention has been granted.

* * * * *